United States Patent
Magoshi et al.

(10) Patent No.: US 8,948,185 B2
(45) Date of Patent: Feb. 3, 2015

(54) RELAY NODE, CONTROL METHOD OF RELAY NODE AND NETWORK SYSTEM

(75) Inventors: Hideyuki Magoshi, Funabashi (JP); Satoshi Kiyotou, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 125 days.

(21) Appl. No.: 13/818,028

(22) PCT Filed: Feb. 28, 2012

(86) PCT No.: PCT/JP2012/001344
§ 371 (c)(1),
(2), (4) Date: Mar. 1, 2013

(87) PCT Pub. No.: WO2013/128483
PCT Pub. Date: Sep. 6, 2013

(65) Prior Publication Data
US 2014/0208152 A1 Jul. 24, 2014

(51) Int. Cl.
*H04L 12/28* (2006.01)
*H04L 1/00* (2006.01)
*H04L 29/08* (2006.01)
*H04L 12/939* (2013.01)

(52) U.S. Cl.
CPC ............. *H04L 1/0091* (2013.01); *H04L 67/00* (2013.01); *H04L 49/555* (2013.01)
USPC .......................................... 370/394; 370/242

(58) Field of Classification Search
None
See application file for complete search history.

(56) References Cited

U.S. PATENT DOCUMENTS

| 2004/0170128 | A1* | 9/2004 | Takamichi | 370/245 |
| 2005/0276216 | A1* | 12/2005 | Vasseur et al. | 370/222 |
| 2008/0080533 | A1* | 4/2008 | Yamane | 370/401 |
| 2008/0151756 | A1* | 6/2008 | Vasseur et al. | 370/237 |
| 2011/0235525 | A1* | 9/2011 | Nishi | 370/242 |
| 2011/0289312 | A1 | 11/2011 | Tateishi et al. | |
| 2012/0063331 | A1* | 3/2012 | Miyazaki | 370/248 |

FOREIGN PATENT DOCUMENTS

| JP | 2010-200300 A | 9/2010 |
| WO | 2011/033894 A1 | 3/2011 |

OTHER PUBLICATIONS

Japanese Office Action received in corresponding Japanese Application No. 2013-183607 dated Sep. 9, 2014.

\* cited by examiner

*Primary Examiner* — Anh-Vu Ly
(74) *Attorney, Agent, or Firm* — Mattingly & Malur, PC

(57) ABSTRACT

A first network device includes: a forwarding controller configured to forward received data; and a fault detector configured to detect occurrence of a failure in a remote second relay node. The forwarding controller includes: a forwarding unit configured to forward the received data; and a modifier configured to modify the received data for detection of the occurrence of a failure in the second relay node. The modifier includes (i) a flag option marker configured to attach a flag to data; (ii) a sequence adding unit configured to add a protocol specific number to a sequence number; and (iii) a sequence subtracting unit configured to subtract the protocol specific number from an acknowledgement number. The fault detector detects the occurrence of a failure in the remote second relay node, based on at least one of the flag and the acknowledgement number.

8 Claims, 15 Drawing Sheets

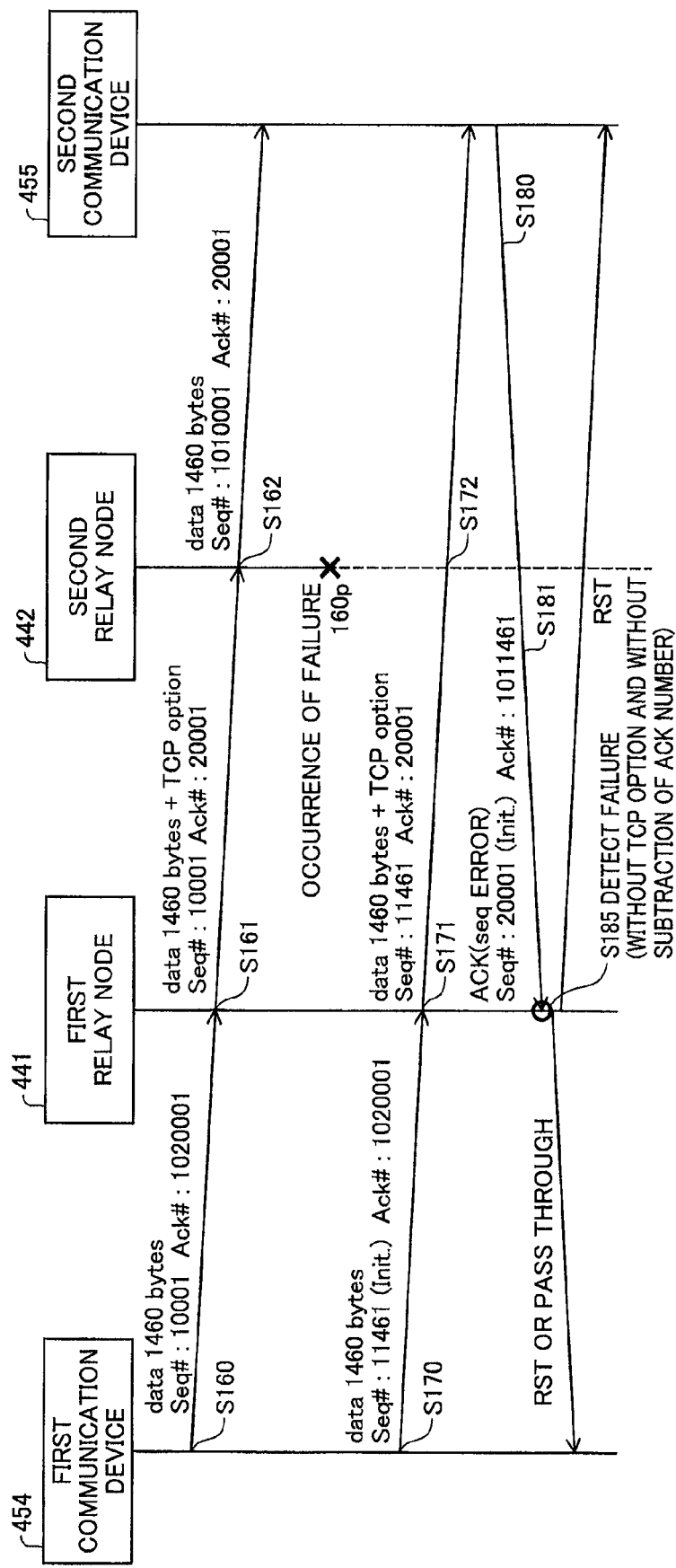

RELAY NODE, CONTROL METHOD OF RELAY NODE AND NETWORK SYSTEM

TECHNICAL FIELD

The present invention relates to a relay node located between terminals and configured to relay data, a control method of the relay node and a network system including terminals and the relay node.

BACKGROUND ART

WANs (Wide Area Networks) based on, for example, IP-VPN technology are generally used as the communication network between global locations. When a terminal at a specific location makes communication with another terminal at a different oversea location, the respective locations are connected by a WAN for communication. In the WAN, the available bandwidth is usually limited by the contract. Overseas communication especially has a significant delay.

TCP is generally used for communication between terminals. TCP controls the bandwidth of communication according to the magnitude of RTT (Round Trip Time). The high throughput may be difficult in communication via the WAN. The technique disclosed in PTL1 has been proposed as the technology enabling the high throughput.

CITATION LIST

Patent Literatures

PTL1: WO2011/033894

SUMMARY

Technical Problem

In communication based on TCP, the transmission bandwidth is significantly affected by the RTT and the rejection rate. In the environment, such as WAN, having the large RTT, a large number of hops and a large number of rejection points, the transmission bandwidth may be significantly less than the contracted bandwidth.

One possible measure against this problem to improve the transmission bandwidth uses a plurality of relay nodes located in the middle of a communication path for data stream service such as TCP using a sequence number and manages the stream to prevent the transmission bandwidth from being affected by the RTT and the rejection rate.

When a failure occurs in a relay node, a remote relay node different from the relay node with the failure may fail to detect the failure. This may cause various troubles, for example, it takes time to cut off communication between communication devices (terminals); a session is left in a relay node, which may interfere with communication at the same port or memory shortage.

In order to solve at least part of the above problems, the object of the invention is to provide a technique of detecting the occurrence of a failure in a remote relay node in the environment of data stream service using a sequence number.

Solution to Problem

In order to solve at least part of the above problems, the invention provides various aspects and embodiments described below.

First Aspect

A first relay node located in a network that comprises two terminals, each being provided to transmit data by data stream service using a sequence number, and the first relay node and a second relay node arranged in series on a communication path between the two terminals and provided to relay data between the two terminals, the first relay node comprising:

a forwarding controller configured to forward received data; and a fault detector configured to detect occurrence of a failure in the remote second relay node, wherein the forwarding controller includes:

a forwarding unit configured to forward the received data; and a modifier configured to modify the received data for detection of the occurrence of a failure in the second relay node, the modifier including (i) a flag option marker configured to attach a flag the flag denoting transmission of data between the first relay node and the second relay node, to data to be forwarded to the second relay node; (ii) a sequence adding unit configured to add a protocol specific number to a sequence number attached to data that is to be sent from one of the terminals as a source terminal when the data is sent to the remote terminal; and (iii) a sequence subtracting unit configured to subtract the protocol specific number from an acknowledgement number attached to data received from the remote terminal, when the data is received from the remote terminal, wherein the fault detector detects the occurrence of a failure in the remote second relay node, based on at least one of the flag and the acknowledgement number.

The first relay node according to the first aspect has the modifier, so that the fault detector can readily detect the occurrence of a failure in the remote second relay node, based on at least one of the flag and the acknowledgement number.

Second Aspect

The first relay node according to the first aspect, wherein the fault detector detects the occurrence of a failure in the second relay node, when the flag is not attached to data received from the second relay node.

The first relay node according to the second aspect readily detects the occurrence of a failure in the second relay node by determining whether the flag is attached to the received data.

Third Aspect

The first relay node according to the first aspect, wherein the fault detector detects the occurrence of a failure in the second relay node, when the acknowledgement number included in data received from the second relay node is equal to sum of the protocol specific number and an expected number to be originally received.

The first relay node according to the third aspect readily detects the occurrence of a failure in the second relay node by determining whether the acknowledgement number included in the received data is equal to the sum of the protocol specific number and the expected number to be originally received.

Fourth Aspect

The first relay node according to the first aspect, wherein
the fault detector detects the occurrence of a failure in the second relay node, when the flag is not attached to data received from the second relay node and when the acknowledgement number included in the received data is equal to sum of the protocol specific number and an expected number to be originally received.

The first relay node according to the fourth aspect improves the accuracy in detection of the occurrence of a failure by using the two elements, i.e., the flag and the acknowledgement number, for detection of a failure.

Fifth Aspect

The first relay node according to any one of the first aspect to the fourth aspect, wherein
the two terminals adopt TCP for communication, and
in the state that the fault detector detects the occurrence of a failure in the second relay node based on received data, when the received data includes an SYN packet as a request for establishment of a TCP connection, the forwarding controller forwards the received data without enabling function of the modifier.

The first relay node according to the fifth aspect can keep data communication even when the occurrence of a failure is detected.

Sixth Aspect

The first relay node according to any one of the first aspect to the fifth aspect, wherein
the two terminals adopt TCP for communication, and
in the state that the fault detector detects the occurrence of a failure in the second relay node based on received data, when the received data includes an acknowledgement packet responding to an SYN packet as a request for establishment of a TCP connection, the forwarding controller forwards the received data without enabling function of the modifier.

The first relay node according to the fifth aspect can keep data communication even when the occurrence of a failure is detected.

The invention is achievable by any of various applications other than the first relay node described above, for example, a control method of the first relay node, a computer program executed to implement the functions of the first control device or the control method, a storage medium in which such a computer program is recorded, and a network system including first and second relay nodes and first and second communication devices.

BRIEF DESCRIPTION OF DRAWINGS

FIG. 15 is a diagram illustrating a second failure detection mode in the event of the occurrence of a failure during data communication by TCP.

DESCRIPTION OF EMBODIMENTS

Embodiments of the present invention are described below in the following sequence:
A. Reference Example
B. Embodiments
C. Modifications

A. Reference Example

Figure 1:
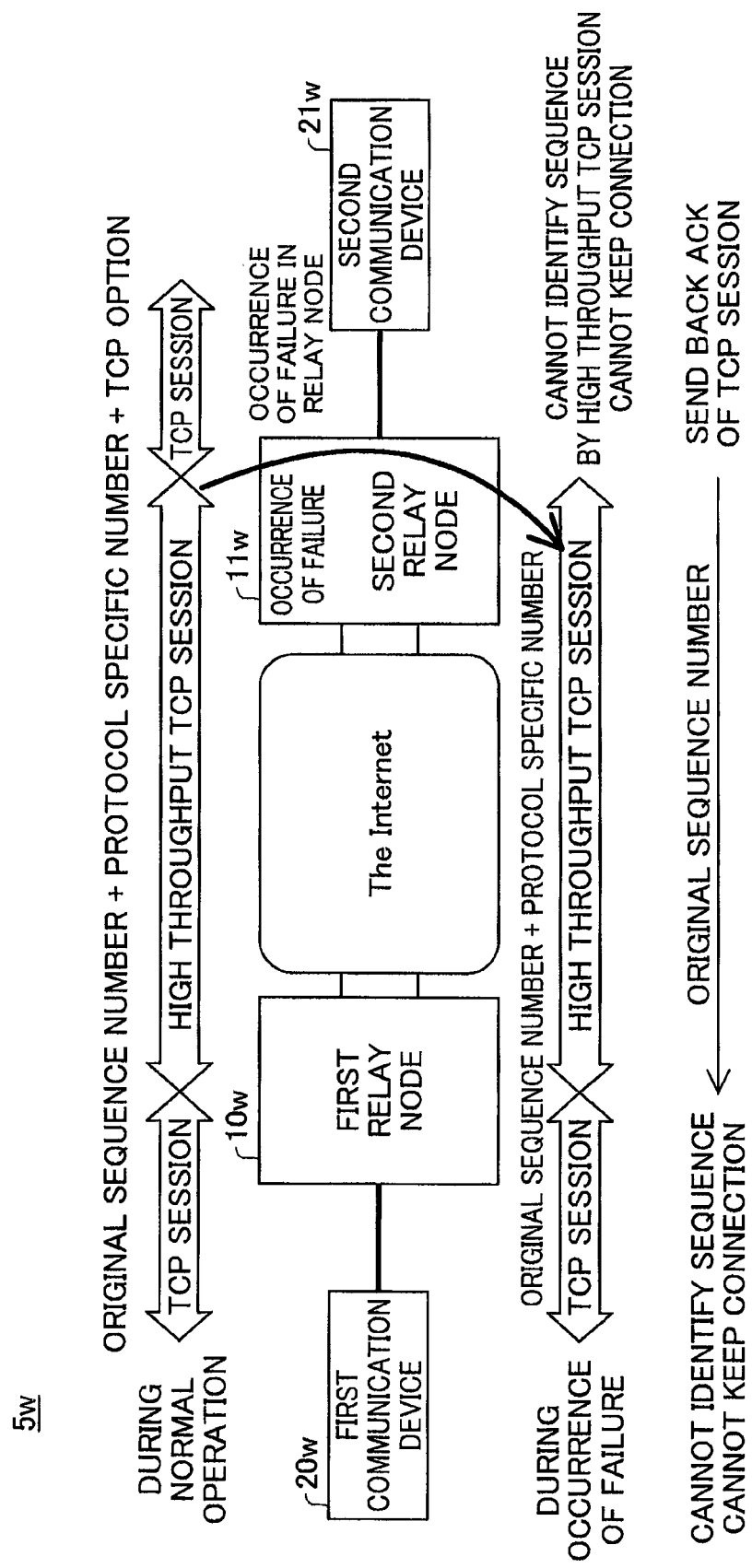
FIG. 1 is a diagram illustrating a network system 5w according to a reference example.

For the better understanding, a reference example, which the present invention is not applied to, is described, prior to description of an embodiment of the invention. FIG. 1 is a diagram illustrating a network system $5w$ according to a reference example. The network system $5w$ includes a first communication device $20w$ as a terminal, a second communication device $21w$ as a terminal, a first relay node $10w$ and a second relay node $11w$. The first and second communication devices $20w$ and $21w$ enable data communication with the first and second relay nodes $10w$ and $11w$ via the Internet.

In the network system $5w$, data communication between the first communication device $20w$ and the first relay node $10w$ and data communication between the second communication device $21w$ and the second relay node are controlled by TCP sessions. Additionally, in the network system $5w$, data communication between the first relay node $10w$ and the second relay node $11w$ is controlled by the relay nodes $10w$ and $11w$ as a unique TCP session between the relay nodes $10w$ and $11w$ (also called "high throughput TCP session").

The high throughput TCP session between the first and second relay nodes $10w$ and $11w$ uses a sequence number (also called "inter-relay node sequence number") determined by addition of a protocol specific number to a sequence number (also called "original sequence number") attached to data sent from the first communication device $20w$ or the second communication device $21w$. For example, the second relay node $11w$ adds a protocol specific number to a sequence number attached to data sent from the second communication device $21w$. The second relay node $11w$ then attaches the sequence number after the addition to the data and sends the data to the first relay node $10w$. In the case of forwarding data from the relay node $10w$ or $11w$ to the communication device $20w$ or $21w$, the sequence number is returned to the original sequence number by subtraction of the added number from the inter-relay node sequence number. The high throughput TCP session between the first and second relay nodes $10w$ and 11w also adds a TCP option for identifying communication between the relay nodes 10w and 11w to the data. The TCP option is deleted from the sent data during transmission of the data from the relay node 10w or 11w to the communication device 20w or 21w.

It is here assumed that a failure occurs in the second relay node 11w (in the event of the occurrence of a failure). The "occurrence of a failure" here means that an abnormality occurs in the function of forwarding data by a high throughput TCP session, while the function of forwarding data (packet) is normal. In other words, the "occurrence of a failure" means the state that the second relay node 11w cannot add a protocol specific number to an original sequence number or the state that the second relay node 11w cannot add or delete a TCP option to or from data.

In the event of the occurrence of a failure, the first relay node 10w adds a protocol specific number to a sequence number of the data sent from the first communication device 20w and sends the resulting data with the inter-relay node sequence number to the second relay node 11w. The second relay node 11w sends the data to the second communication device 21w without processing the inter-relay node sequence number attached to the received data. The second communication device 21w identifies the received data as improper data, since the sequence number of the received data is different from the sequence data in the TCP session (original sequence number). The second communication device 21w then sends an ACK with the sequence number used in the TCP session (original sequence number). The first relay node 10w cannot, however, identify the sequence number sent from the second communication device 21w and thereby cannot forward data to the first communication device 20w. This causes a problem, such as unable to keep connection between the first and second communication devices 20w and 21w or unable to disconnect a session.

B. Embodiments

Figure 2:
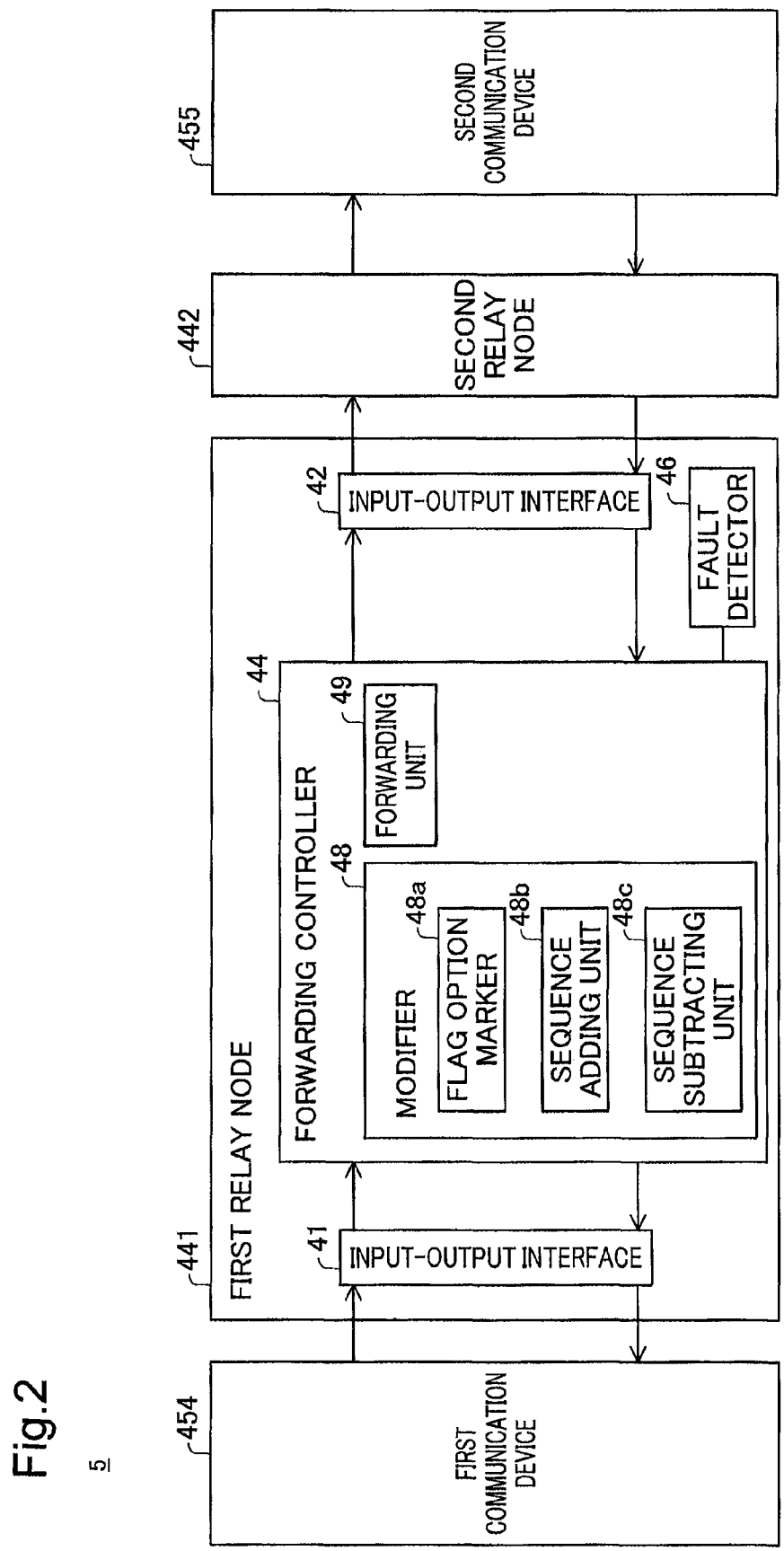
FIG. 2 is a diagram illustrating a network system 5 according to one embodiment.

FIG. 2 is a diagram illustrating a network system 5 according to one embodiment of the invention. As shown in FIG. 2, the network system 5 includes first and second communication devices 454 and 455 as terminals and first and second relay nodes 441 and 442 configured to relay data communication between the first communication device 454 and the second communication device 455. The first and second relay nodes 441 and 442 are arranged in series on the communication path between the first and second communication devices 454 and 455. The first and second communication devices 454 and 455 perform data (packet) communication according to a TCP. There is the internet (not shown) between the first relay node 441 and the second relay node 442.

The first relay node 441 includes input-output interfaces 41 and 42 configured to receive and send data from and to an external device (for example, the first communication device 454), a forwarding controller 44 configured to control forwarding of received data and a fault detector 46 configured to detect a failure in the other relay node 442. The second relay node 442 has the similar internal configuration, which is thus neither specifically illustrated nor described.

The forwarding controller 44 includes a modifier 48 configured to modify data sent and received and a forwarding unit 49 configured to forward data. The forwarding unit 49 forwards the data, based on, for example, an IP address attached to the received data.

The modifier 48 includes a flag option marker 48a, a sequence adding unit 48b and a sequence subtracting unit 48c. The flag option marker 48a attaches a flag denoting data exchanging between the first and second relay nodes to the data that is to be forwarded to the remote second relay node 442. According to this embodiment, a TCP option of a TCP header is used as this flag. The sequence adding unit 48b adds a protocol specific number to a sequence number (original sequence number) attached to data received from a source communication device (for example, the second communication device 455), when the sequence adding unit 48b sends the data to a remote communication device (for example, the first communication device 454). An arbitrary value is selectable as the protocol specific number, and a number 1000000 is added to the original sequence number in this embodiment. The sequence subtracting unit 48c subtracts a protocol specific number (1000000 in this embodiment) from an acknowledgement number attached to the data received from the remote communication device (for example, the first communication device 454). The first and second relay nodes 441 and 442 respectively have a session management table (not shown) for management of unique communication between the relay nodes 441 and 442.

The modifier 48 may have a function of enabling high-speed data transmission between the first and second relay nodes 441 and 442. The modifier 48 may have, for example, the features disclosed in International Publication WO2011/033894 (international filing date: Aug. 19, 2010). The modifier 48 of the first or second relay node 441 or 442 may have a bandwidth controller configured to control a transmission bandwidth for data transmission based on the data retransmission status. When the modifier 48 with the bandwidth controller normally works, the forwarding unit 49 may forward data according to the controlled transmission bandwidth.

The fault detector 46 detects the occurrence of a failure in the remote second relay node 442, based on at least one of the TCP option and the acknowledgement number. The occurrence of a failure detected by the fault detector 46 may be sent, for example, to a server (not shown) as failure occurrence information. The server may then analyze the failure occurrence information and notify outside of the occurrence of a failure.

Figure 3:
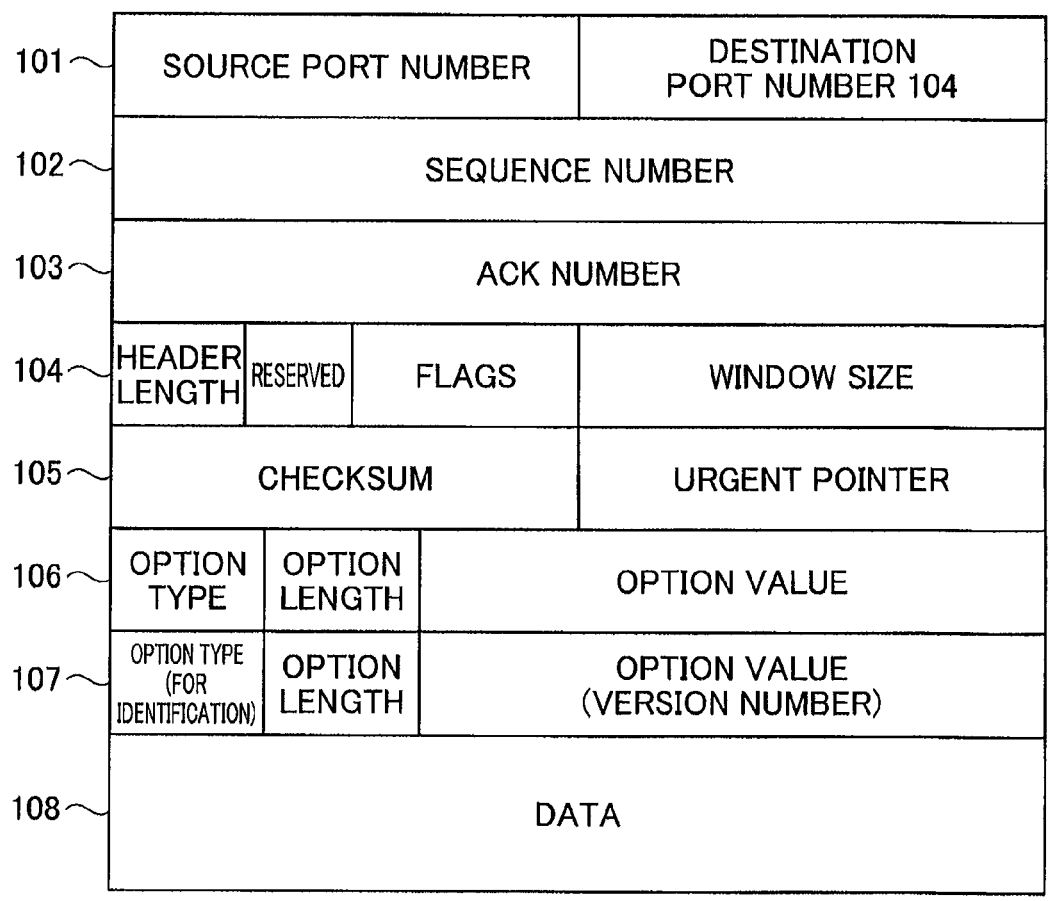
FIG. 3 is a diagram showing a TCP header used in the embodiment.

FIG. 3 is a diagram showing a TCP header used in the embodiment. The TCP header shown in FIG. 3 has the ordinary header structure specified by TCP. A source port number and a destination port number are stored in a field 101. A sequence number is stored in a field 102. An acknowledgement number (ACK number) is stored in a field 103. A header length, various flags such as ACK flag and information such as window size are stored in a field 104. A checksum and an urgent pointer are stored in a filed 105. An option type, an option length and an option value are stored in a field 106. More specifically, information regarding MSS (Maximum Segment Size) is stored in the field 106. An option type, an option length and an option value (version number) are stored in a field 107. More specifically, information regarding a TCP option added to data during data communication between the first and second relay nodes 441 and 442. A field 108 is a data field.

Figure 4:
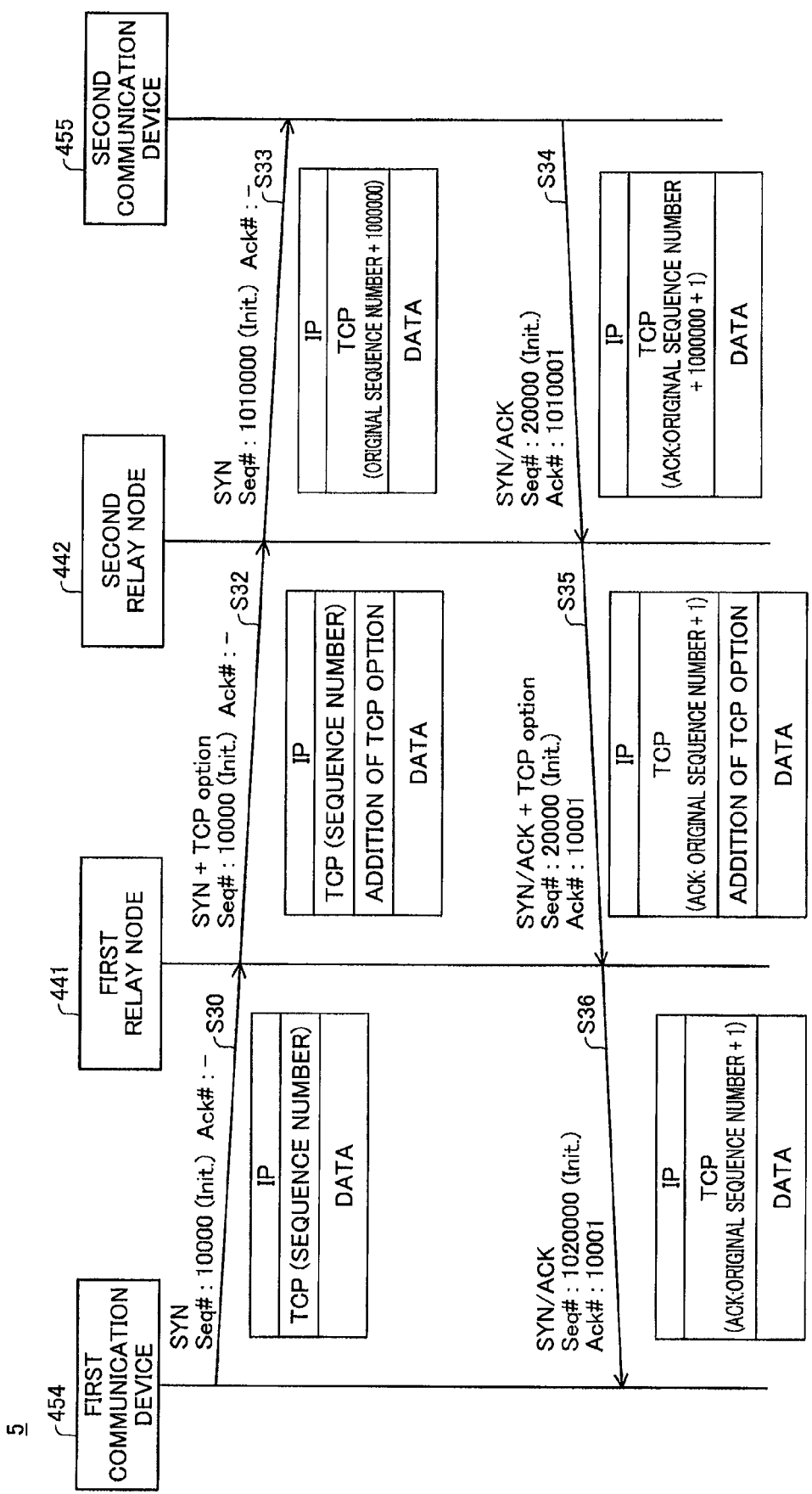
FIG. 4 is a diagram illustrating a change of a TCP head during data communication in the network system 5.

FIG. 4 is a diagram illustrating a change of a TCP head during data communication in the network system 5. FIG. 4 illustrates part of communication performed on establishment of a connection (during three-way handshake) as an example. The first communication device 454 starts communication by a standard TCP performed between terminals (step S30) and, for example, sends an SYN packet with a sequence number (Seq#) 10000. The flag option marker 48a of the first relay node 441 adds a TCP option to the received data, and the forwarding unit 49 sends the resulting data to the second relay node 442 (step S32). The flag option marker 48a of the second relay node 442 deletes the TCP option from the received data, and the sequence adding unit 48b of the second relay node adds 1000000 to the sequence number of the received data (step S33). The forwarding unit 49 then sends the resulting processed data to the second communication device 455 (step S33).

The second communication device 455 performs the standard TCP process to determine an ACK number by addition of an expected sequence number subsequent to the sequence number of the received data and send the ACK number (step S34). According to this embodiment, the ACK number is determined by adding the protocol specific number 1000000 and a value 1 to the original sequence number sent at step S30. The sequence subtracting unit 48c of the second relay node 442 subtracts the protocol specific number 1000000 from the ACK number of the data sent from the second communication device 455 as the source to be consistent with the original sequence number (step S35). The flag option marker 48a of the second relay node 442 also adds a TCP option to the data (step S35). The forwarding unit 49 of the second relay node 442 then sends the resulting processed data to the first relay node 441 (step S35). The flag option marker 48a of the first relay node 441 deletes the TCP option from the data received from the second relay node 442 to be consistent with the original stream (step S36). The first relay node 441 also adds the protocol specific number 1000000 to the sequence number of the received data (step S36). The forwarding unit 49 of the first relay node 441 then sends the resulting processed data to the first communication device 454 (step S36). After step S36, the first relay node 441 sends an ACK packet with the ACK number of the received SYN/ACK packet as the sequence number to the first relay node 441, although not being illustrated. The modifier 48 of the first relay node 441 or the second relay node 442 performs predetermined processing to the received ACK packet. Finally the second communication device 455 receives the ACK packet to establish a connection.

Figure 5:
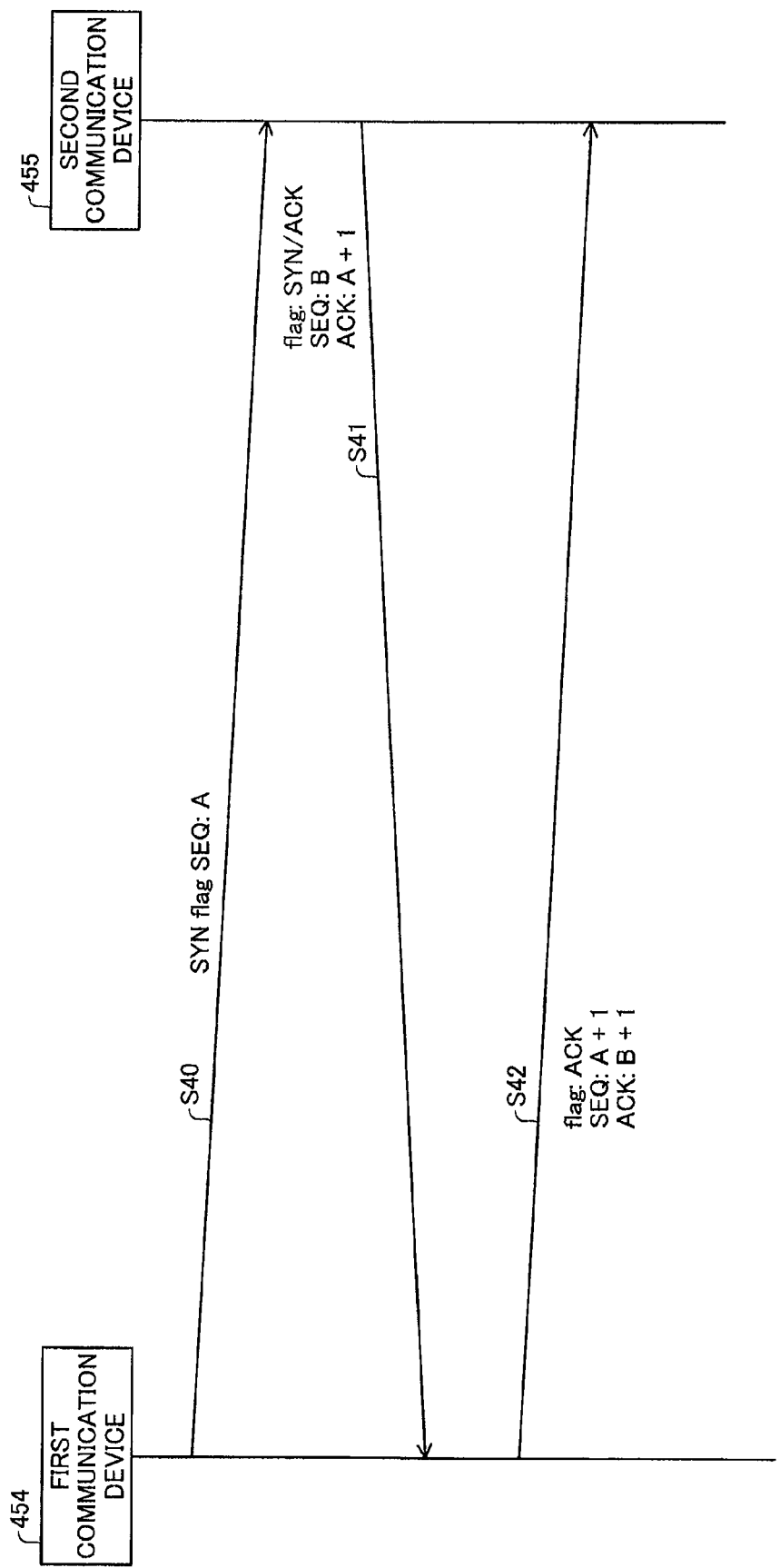
FIG. 5 shows a process flow of generally performed three-way handshake.

In order to facilitate understanding, the general procedure of three-way handshake is described. FIG. 5 shows a process flow of generally performed three-way handshake. In other words, FIG. 5 shows a general process flow of three-way handshake without application of the present invention. The first communication device 454 sends an SYN packet with any sequence number A (an arbitrary number is input in A) to the second communication device 455 (step S40). The second communication device 455 sends back an SYN/ACK packet with any sequence number B (an arbitrary number different from A is input in B) and an ACK number set by adding a value 1 to the received sequence number A, to the first communication device 454, as a response to the received SYN packet (step S41). When receiving the SYN/ACK packet, the first communication device 454 sets a sequence number by adding a value 1 to the sequence number A of the SYN packet (i.e., ACK number sent at step S41) (step S42). The first communication device 454 also sets an ACK number (B+1) by adding a value 1 to the sequence number B sent at step S41 (step S42) and then sends the data with the sequence number and the ACK number to the second communication device 455 (step S42). This establishes a connection between the first and second communication devices 454 and 455.

Figure 6:
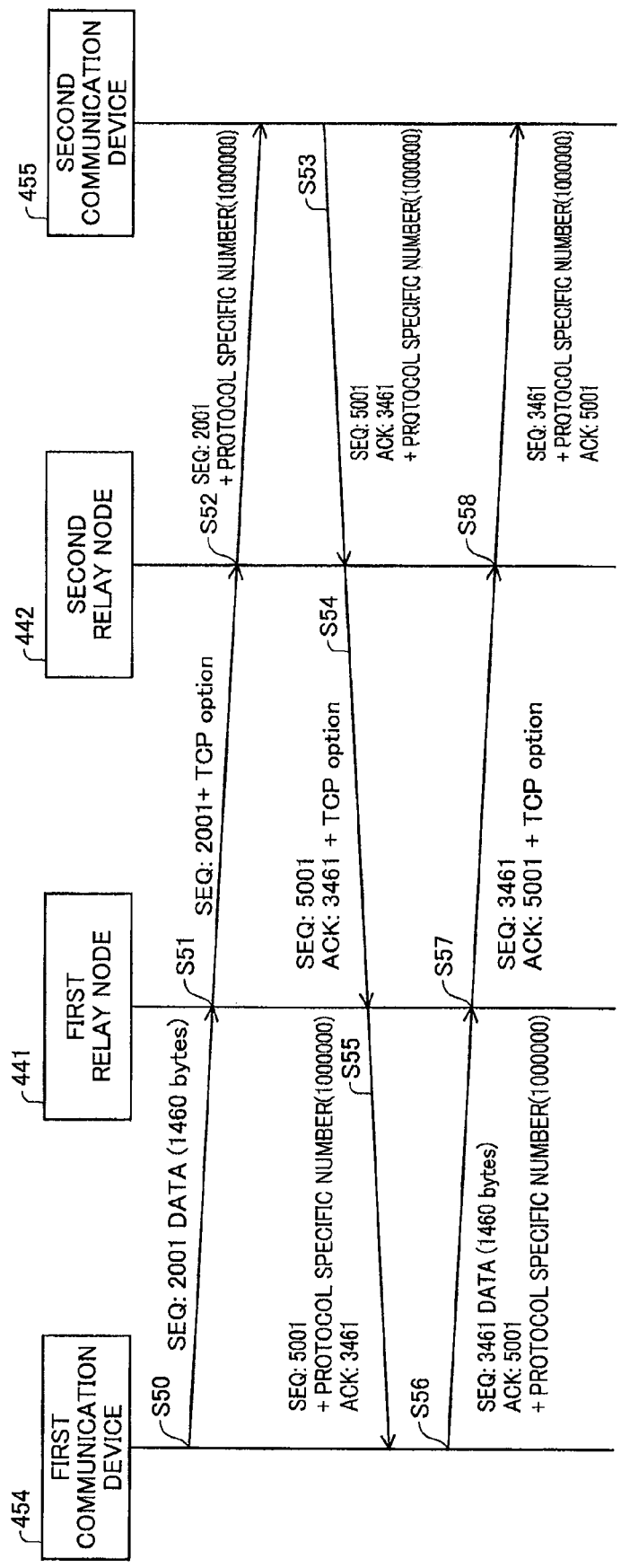
FIG. 6 is a diagram illustrating communication after establishment of a connection.

FIG. 6 is a diagram illustrating communication after establishment of a connection in the network system 5. In FIG. 6, it is assumed that the amount of data sent from the first communication device 454 is 1460 bytes. The first communication device 454 sends data with a predetermined sequence number (sequence number 2001 in this illustrated example) to the first relay node 441 (step S50). The first relay node 441 adds a TCP option to the received data and sends the resulting data to the second relay node 442 (step S51). Addition of the TCP option to the data allows discrimination from communication using the standard TCP. When receiving the data sent from the first relay node 441, the second relay node 442 deletes the TCP option from the received data and adds a protocol specific number (1000000 in this illustrated example) to the sequence number (step S52). The second relay node 442 then sends the resulting processed data to the second communication device 455 (step S52).

The second communication device 455 sends the data with an ACK number set by adding the protocol specific number (1000000 in this illustrated example) to a number expected to be received subsequently, to the second relay node 442 (step S53). When receiving the data sent from the second relay node 442, the first relay node 441 adds a TCP option to the received data and subtracts the protocol specific number (1000000 in this illustrated example) from the acknowledgement number (step S54). This gives the ACK number to the original sequence number sent at step S50. The second relay node 442 then sends the resulting processed data to the first relay node 441 (step S54). When receiving the data sent from the second relay node 442, the first relay node 441 deletes the TCP option from the received data and adds the protocol specific number (1000000 in this illustrated example) to the sequence number (step S55). The first relay node 441 then sends the resulting processed data to the first communication device 454 (step S55).

The network system 5 performs the similar series of processing with respect to data communication after step S55 (i.e., steps S56 to S58). More specifically, the operation of step S56 is similar to the operation of step S50; the operation of step S57 is similar to the operation of step S51; and the operation of step S58 is similar to the operation of step S52.

The following describes in detail the method of detecting the occurrence of a failure in various situations in the first and second relay nodes 441 and 442 in the network system 5.

B-2. Detection of Occurrence of Failure

B-2-1. Detection of Occurrence of Failure During Three-Way Handshake

Figure 7:
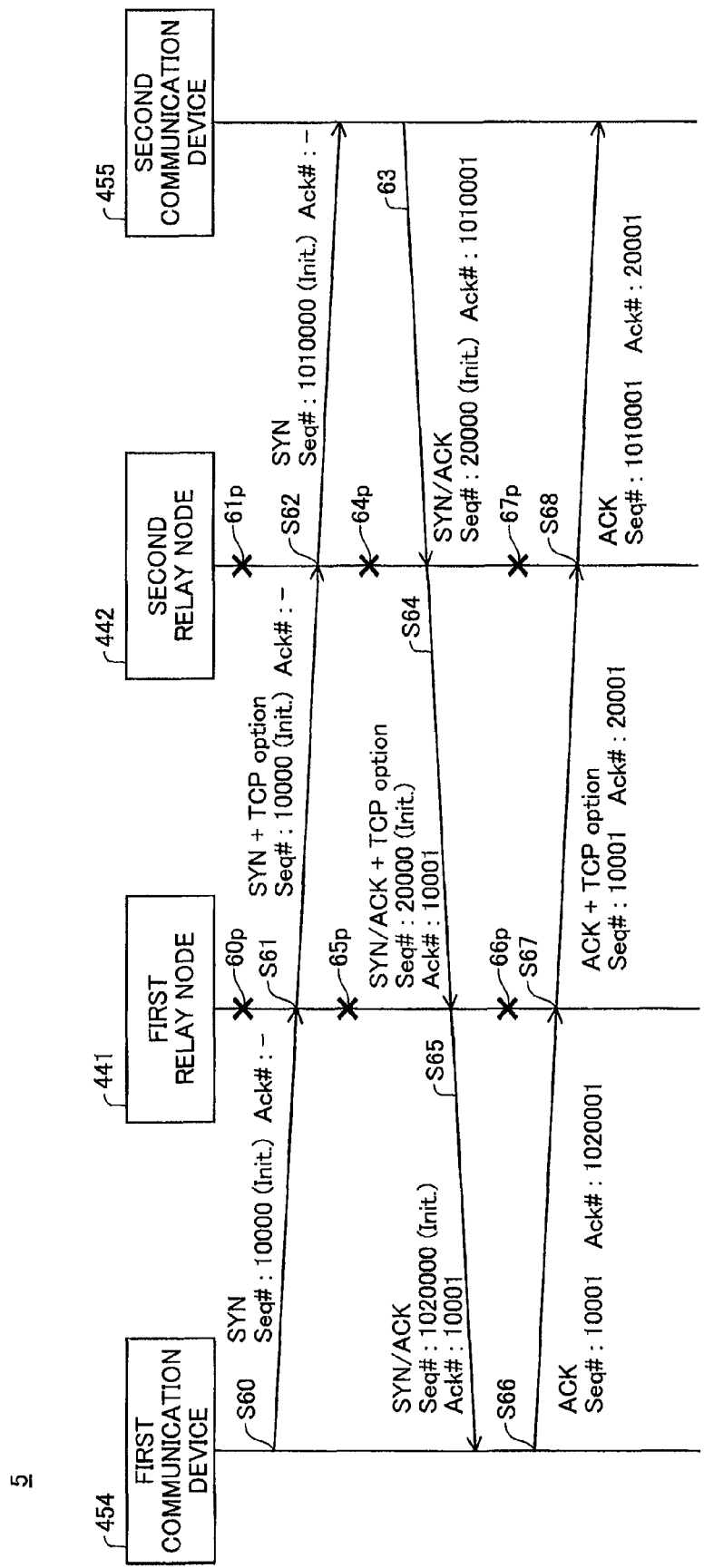
FIG. 7 is a diagram illustrating detection of the occurrence of a failure during three-way handshake.

FIG. 7 is a diagram illustrating detection of the occurrence of a failure during three-way handshake. More specifically, FIG. 7 is a diagram illustrating the method of detecting the occurrence of a failure when a failure occurs in either of the first relay node 441 and the second relay node 442 (more specifically a failure occurrence in the modifier 8) during three-way handshake.

The TCP protocol establishes a connection by sending back an SYN/ACK packet responding to an SYN packet and sending back an ACK packet responding to the SYN/ACK packet. More specifically, a connection is established according to the steps described below:

Step S60: sending an SYN packet from the first communication device 454 to the first relay node 441;

Step S61: adding a TCP option to the data and sending the resulting data from the first relay node 441 to the second relay node 442;

Step S62: deleting the TCP option from the data, adding a protocol specific number 1000000 to the sequence number and sending the resulting data from the second relay node 442 to the second communication device 455;

Step S63: sending an SYN/ACK packet with an ACK number set by adding a value 1 to the sequence number from the second communication device 455 to the second relay node 442;

Step S64: adding a TCP option to the data, subtracting the protocol specific number 1000000 from the ACK number and sending the resulting data from the second relay node 442 to the first relay node 441;

Step S65: deleting the TCP option from the data, adding the protocol specific number 1000000 to the sequence number and sending the resulting data from the first relay node 441 to the first communication device 454;

Step S66: setting the received ACK number to a sequence number, adding a value 1 to the received sequence number and sending an ACK packet from the first communication device 454 to the first relay node 441;

Step S67: adding a TCP option to the data and sending the resulting data from the first relay node 441 to the second relay node 442; and Step S68: deleting the TCP option from the data, adding the protocol specific number 1000000 to the sequence number and sending the resulting data from the second relay node 442 to the second communication device 455.

The following describes the outline of the method of detecting a failure when the failure occurs at respective points 60*p*, 61*p*, 64*p*, 65*p*, 66*p* and 67*p* shown in FIG. 7.

In the event of the occurrence of a failure at the point 60*p* (first failure detection mode):

Since no TCP option is added to the SYN packet, the failure can be detected by the second relay node 442;

In the event of the occurrence of a failure at the point 61*p* (second failure detection mode):

Since no TCP option is added to the SYN/ACK packet, the failure can be detected by the first relay node 441;

In the event of the occurrence of a failure at the point 64*p* (third failure detection mode):

Since no TCP option is added to the SYN/ACK packet and there is no sequence subtraction from the ACK number, the failure can be detected by the first relay node 441;

In the event of the occurrence of a failure at the point 65*p* (fourth failure detection mode):

Since no TCP option is added to the ACK packet, the failure can be detected by the second relay node 442;

In the event of the occurrence of a failure at the point 66*p* (fifth failure detection mode):

Since no TCP option is added to the ACK packet and there is no sequence subtraction from the ACK number, the failure can be detected by the second relay node 442; and In the event of the occurrence of a failure at the point 67*p* (sixth failure detection mode):

Since no TCP option is added to the retransmitted SYN/ACK packet and there is no sequence subtraction from the ACK number, the failure can be detected by the first relay node 441.

The following describes the detailed process flows in the event of the occurrence of a failure at each of the points 60*p*, 61*p*, 64*p*, 65*p*, 66*p* and 67*p* as respective modes of failure detection.

B-2-2. First Failure Detection Mode

Figure 8:
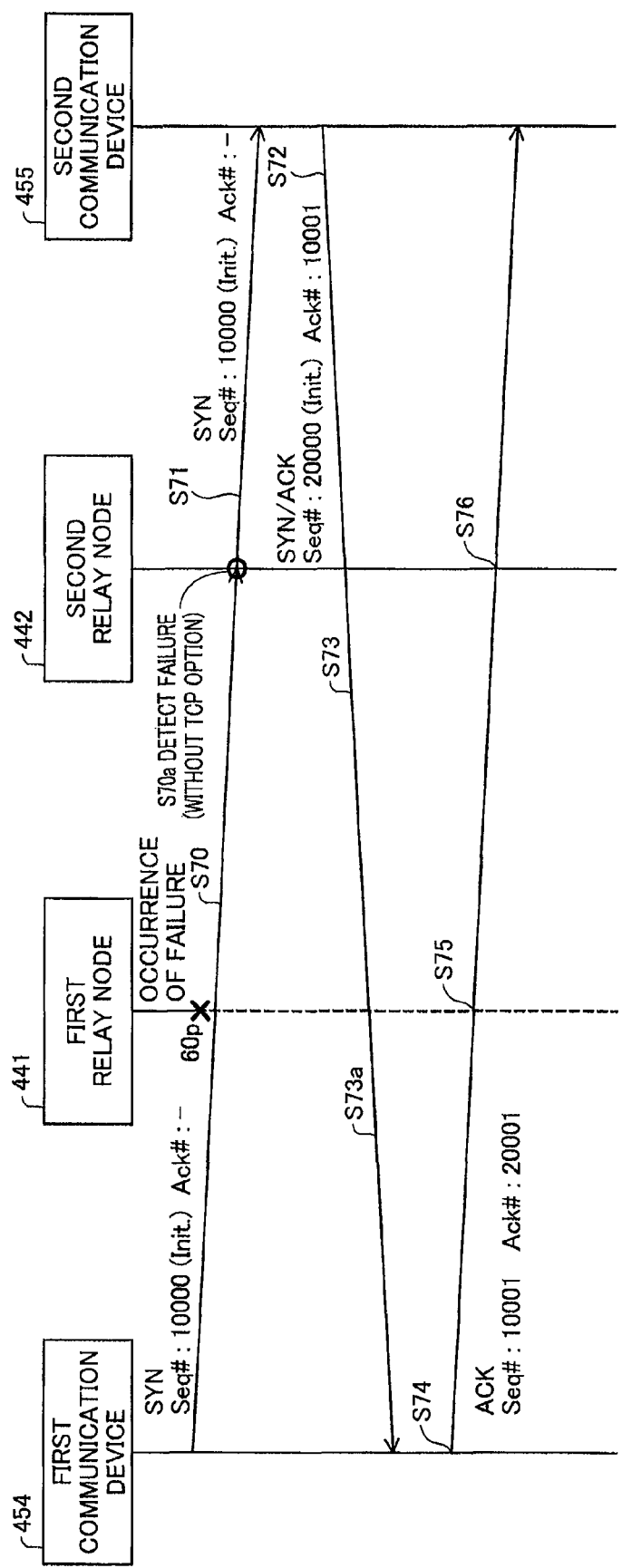
FIG. 8 is a diagram illustrating a first mode of failure detection during three-way handshake.

FIG. 8 is a diagram illustrating a first mode of failure detection during three-way handshake. More specifically, FIG. 8 shows a process flow in the event of the occurrence of a failure in the first relay node 441 at the point 60*p* when the first communication device 454 sends an SYN packet.

When the first communication device 454 sends an SYN packet, the modifier 48 of the first relay node 441 cannot process the SYN packet, so that the first relay node 441 passes through the SYN packet (step S70). The fault detector 46 of the second relay node 442 detects no addition of a TCP option to the received SYN packet and thereby detects the occurrence of a failure in the first relay node 441 (step S70*a*). The process of and after step S71 forwards data by a standard TCP session since no unique session (high-throughput session) usable between the first and second relay nodes 441 and 442 is established between the first and second relay nodes 441 and 442 in the network system 5. More specifically, after step S71, the second communication device 455 sends an SYN/ACK packet to the second relay node 442, and the second relay node 442 and the first relay node 441 forward the received SYN/ACK packet toward the first communication device 454 (steps S73 and S73*a*). When receiving the SYN/ACK packet, the first communication device 454 sends an ACK packet with a sequence number set by adding a value 1 to the sequence number 10000 of the SYN packet (i.e., ACK number sent at step S72) toward the second communication device 455 (step S74). The first relay node 441 and the second relay node 442 pass through the ACK packet sent from the first communication device 454 and forward the ACK packet to the second communication device 455 (steps S75 and S76). This establishes a connection between the first communication device 454 and the second communication device 455.

B-2-3. Second Failure Detection Mode

Figure 9:
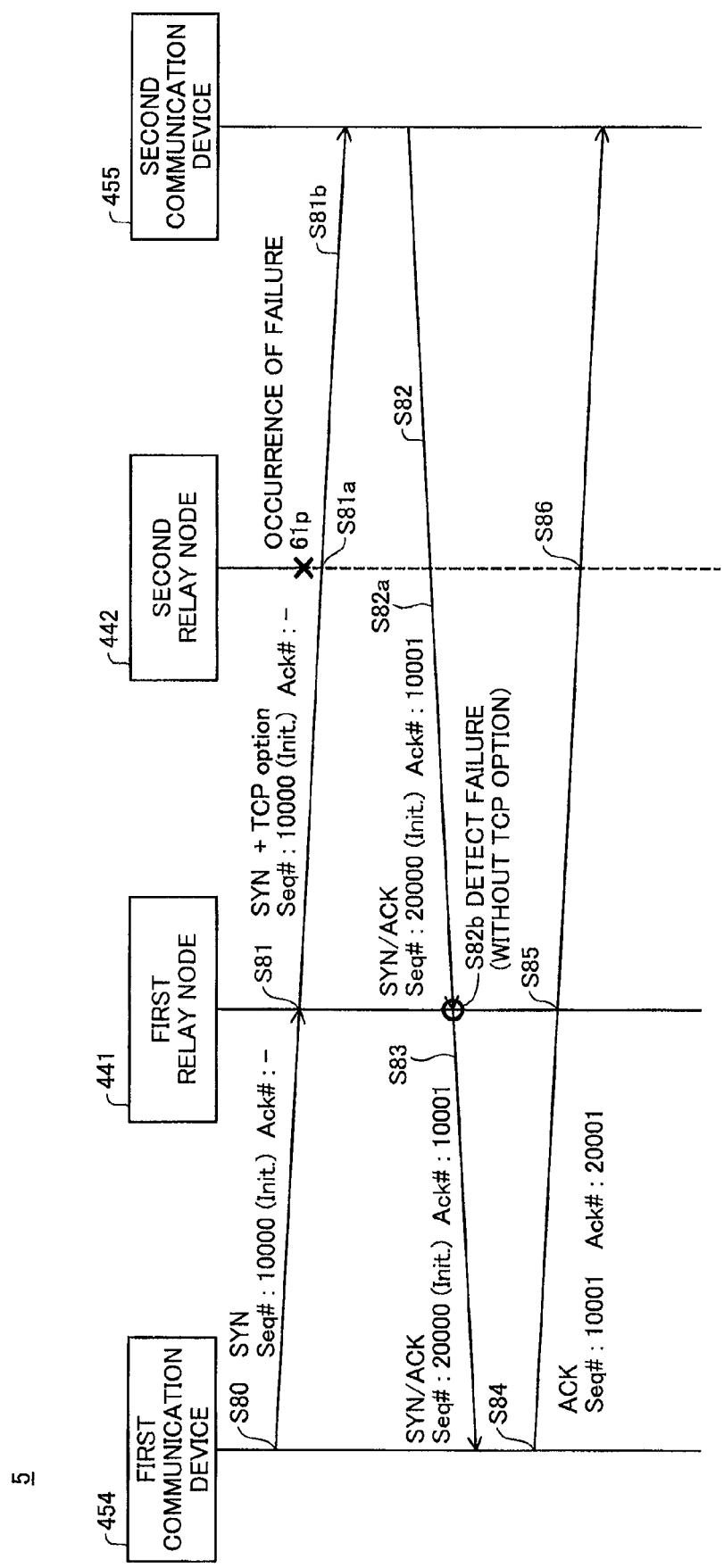
FIG. 9 is a diagram illustrating a second mode of failure detection during three-way handshake.

FIG. 9 is a diagram illustrating a second mode of failure detection during three-way handshake. More specifically, FIG. 9 shows a process flow in the event of the occurrence of a failure in the second relay node 442 at the point 61*p* when the first communication device 454 sends an SYN packet.

In order to establish a connection, an SYN packet is sent from the first communication device 454 to the first relay node 441 (step S80). When receiving the SYN packet from the first communication device 454, the first relay node 441 adds a TCP option to the received SYN packet and sends the SYN packet with the TCP option to the second relay node 442 (step S81). The modifier 48 of the second relay node 442 (FIG. 2) cannot, however, perform predetermined processing, so that the second relay node 442 passes through the SYN packet and sends the SYN packet to the second communication device 455 (step S81*a*). Although the TCP option is added to the received SYN packet, the second communication device 455 that does not support the TCP option cannot interpret the TCP option and thereby ignores the TCP option (step S81*b*). The second communication device 455 then sends an SYN/ACK packet to the second relay node 442 as a response to the received SYN packet (step S82). The second relay node 442 sends the SYN/ACK packet received from the second communication device 455 to the first relay node 441 without processing the received SYN/ACK packet by its modifier 48 (step S82*a*). The first relay node 441 detects no addition of a TCP option to the SYN/ACK packet received from the second relay node 442 and thereby detects the occurrence of a failure in the second relay node 442 (step S82*b*). At step S82*b*, the first relay node 441 eliminates the session management table after detection of the occurrence of the failure and causes subsequent communication to pass through the first relay node 441.

The first relay node 441 sends (passes through) the SYN/ACK packet to the first communication device 454 without enabling the function of its modifier 48 at step S83. When receiving the SYN/ACK packet, the first communication device 454 sends an ACK packet with a sequence number set by adding a value 1 to the sequence number 10000 of the SYN packet (i.e., ACK number sent at step S83) toward the second communication device 455 (step S84). The ACK packet sent at step S84 sequentially passes through the first relay node 441, the second relay node 442 and the second communication device 455 to be forwarded by the standard TCP session (steps S85 and S86). This establishes a connection between the first communication device 454 and the second communication device 455.

B-2-4. Third Failure Detection Mode

Figure 10:
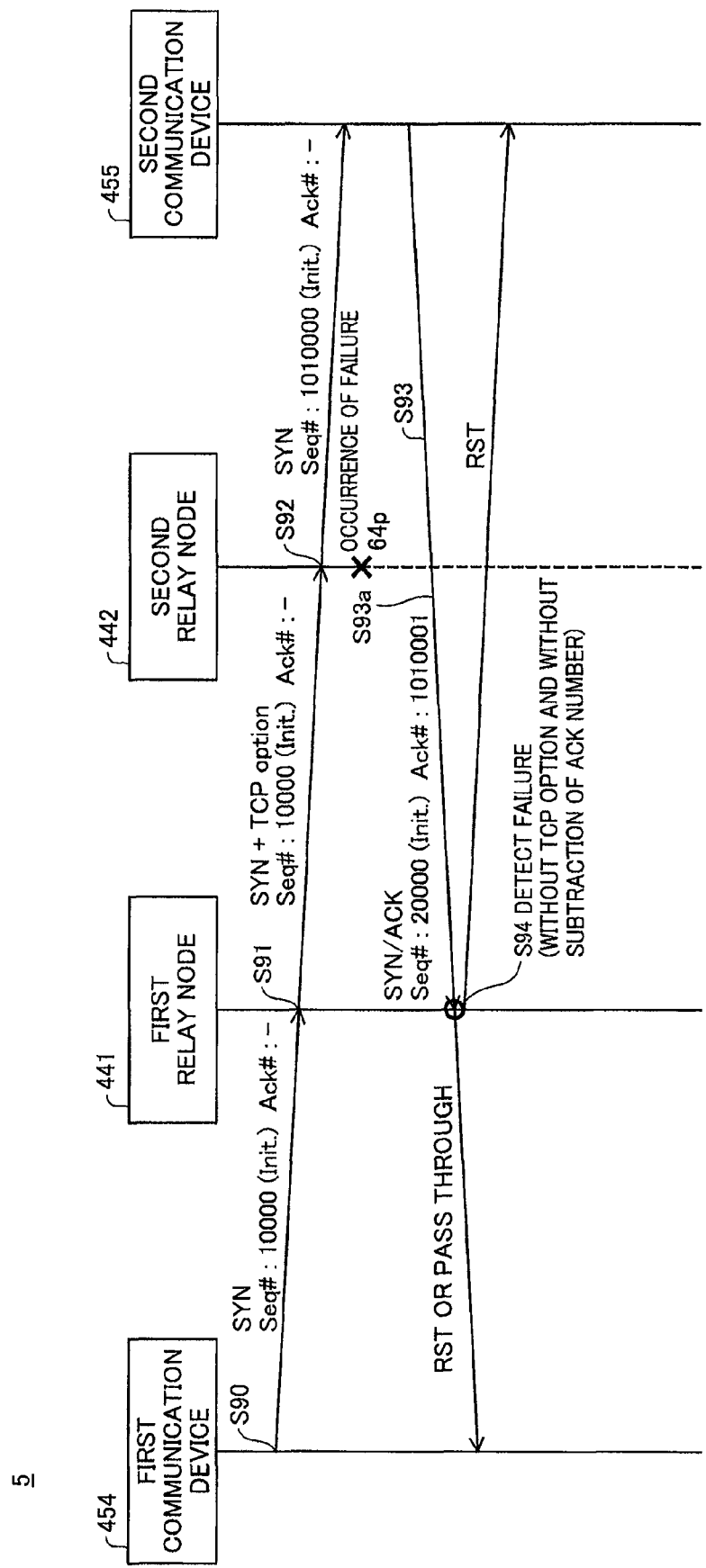
FIG. 10 is a diagram illustrating a third mode of failure detection during three-way handshake.

FIG. 10 is a diagram illustrating a third mode of failure detection during three-way handshake. More specifically, FIG. 10 shows a process flow in the event of the occurrence of a failure in the second relay node 442 at the point 64p when the second relay node 442 sends an SYN packet to the second communication device 455.

Steps S90 to S92 in FIG. 10 are the same processing steps as steps S60 to S62 shown in FIG. 7 and are thus not specifically described here. After step S92, the second communication device 455 sends an SYN/ACK packet to the second relay node 442 as a response to the received SYN packet (step S93). The second relay node 442 passes through the received SYN/ACK packet and sends the SYN/ACK packet to the first relay node 441 (step S93a). The first relay node 441 detects no addition of a TCP option to the received SYN/ACK packet and no sequence subtraction from the ACK number and thereby detects the occurrence of a failure in the remote second relay node 442 (step S94). According to this embodiment, when the number obtained by subtracting the protocol specific number (1000000) from the received ACK number is equal to the ACK number expected to be originally received, the fault detector 46 of the second relay node 442 detects no sequence subtraction from the ACK number. After detecting the occurrence of a failure in the remote second relay node 442, the first relay node 441 may send a reset (RST) packet to the second communication device 455 via the first communication device 454 and the second relay node 442 and forcibly terminate the subsequent communication. After detecting the occurrence of a failure in the remote second relay node 442, the first relay node 441 may pass through the received SYN/ACK packet and send the SYN/ACK packet to the first communication device 454, so as to continue the process of three-way handshake.

B-2-5. Fourth Failure Detection Mode

Figure 11:
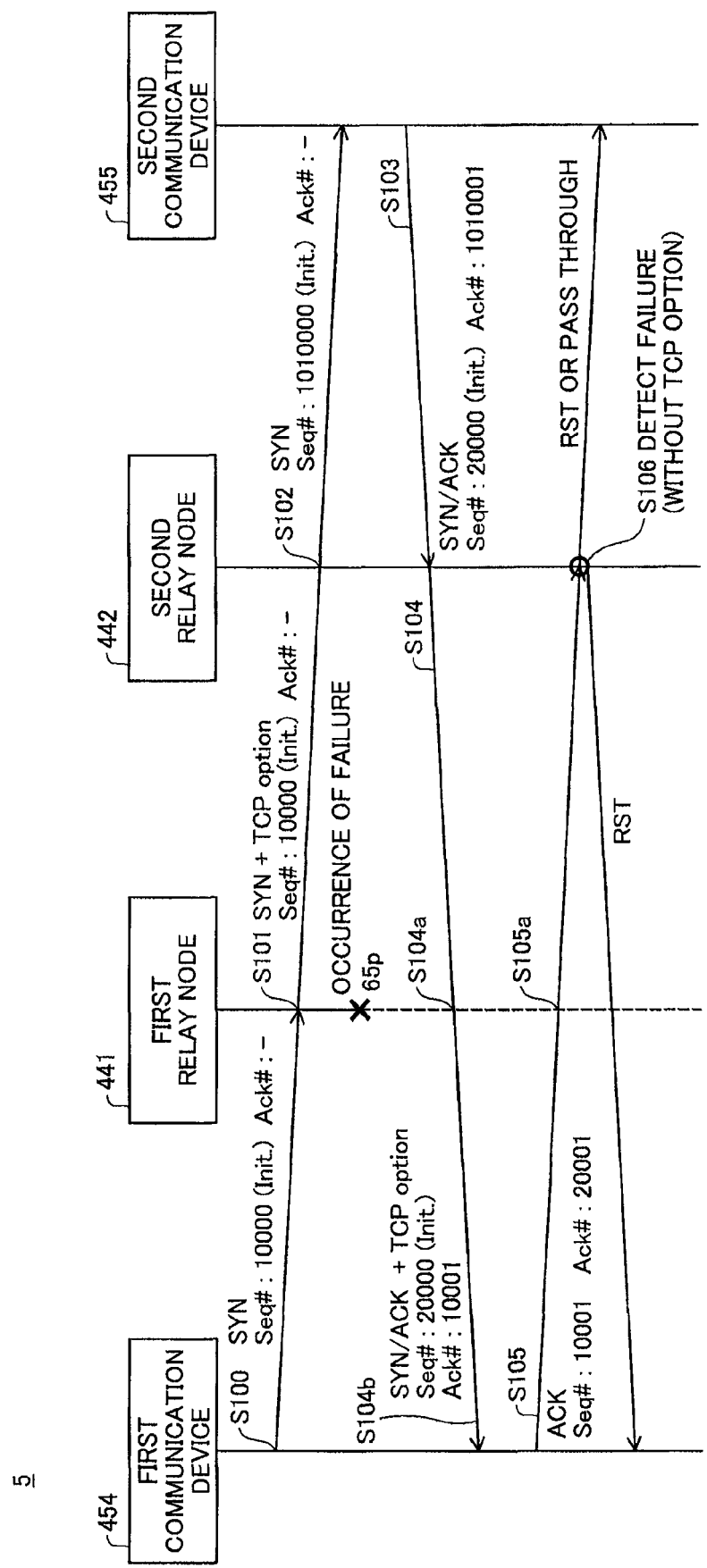
FIG. 11 is a diagram illustrating a fourth mode of failure detection during three-way handshake.

FIG. 11 is a diagram illustrating a fourth mode of failure detection during three-way handshake. More specifically, FIG. 11 shows a process flow in the event of the occurrence of a failure in the first relay node 441 at the point 65p when the first relay node 441 sends an SYN packet to the second relay node 442.

Steps S100 to S103 in FIG. 11 are the same processing steps as steps S60 to S63 shown in FIG. 7 and are thus not specifically described here. When receiving an SYN/ACK packet from the second communication device 455, the second relay node 442 adds a TCP option to the received SYN/ACK packet and send the SYN/ACK packet with subtraction of the protocol specific number from the acknowledgement number to the first relay node 441 (step S104). Since a failure occurs in the modifier 48, the first relay node 441 sends the SYN/ACK packet received from the second relay node 442 to the first communication device 454 without processing the received SYN/ACK packet by its modifier 48 (step S104a). Although the TCP option is kept with the SYN/ACK packet sent to the first communication device 454, the first communication device 454 cannot interpret the TCP option and can thus receive the SYN/ACK packet with the TCP option (step S104b). The first communication device 454 then sends an ACK packet to the first relay node 441 with setting the ACK number of the received SYN/ACK packet as a sequence number (step S105). The first relay node 441 passes through the ACK packet sent from the first communication device 454 and sends the ACK packet to the second relay node 442 (step S105a). The second relay node 442 detects no addition of a TCP option to the ACK packet sent from the first relay node 441 and thereby detects the occurrence of a failure in the remote first relay node 441 (step S106). After detecting the occurrence of a failure in the remote first relay node 441, the second relay node 442 may send an RST packet to the first communication device 454 via the second communication device 455 and the first relay node 441 and forcibly terminate the subsequent communication. After detecting the occurrence of a failure in the remote first relay node 441, the second relay node 442 may pass through the received ACK packet and send the ACK packet to the second communication device 455, so as to continue the process of three-way handshake.

B-2-6. Fifth Failure Detection Mode

Figure 12:
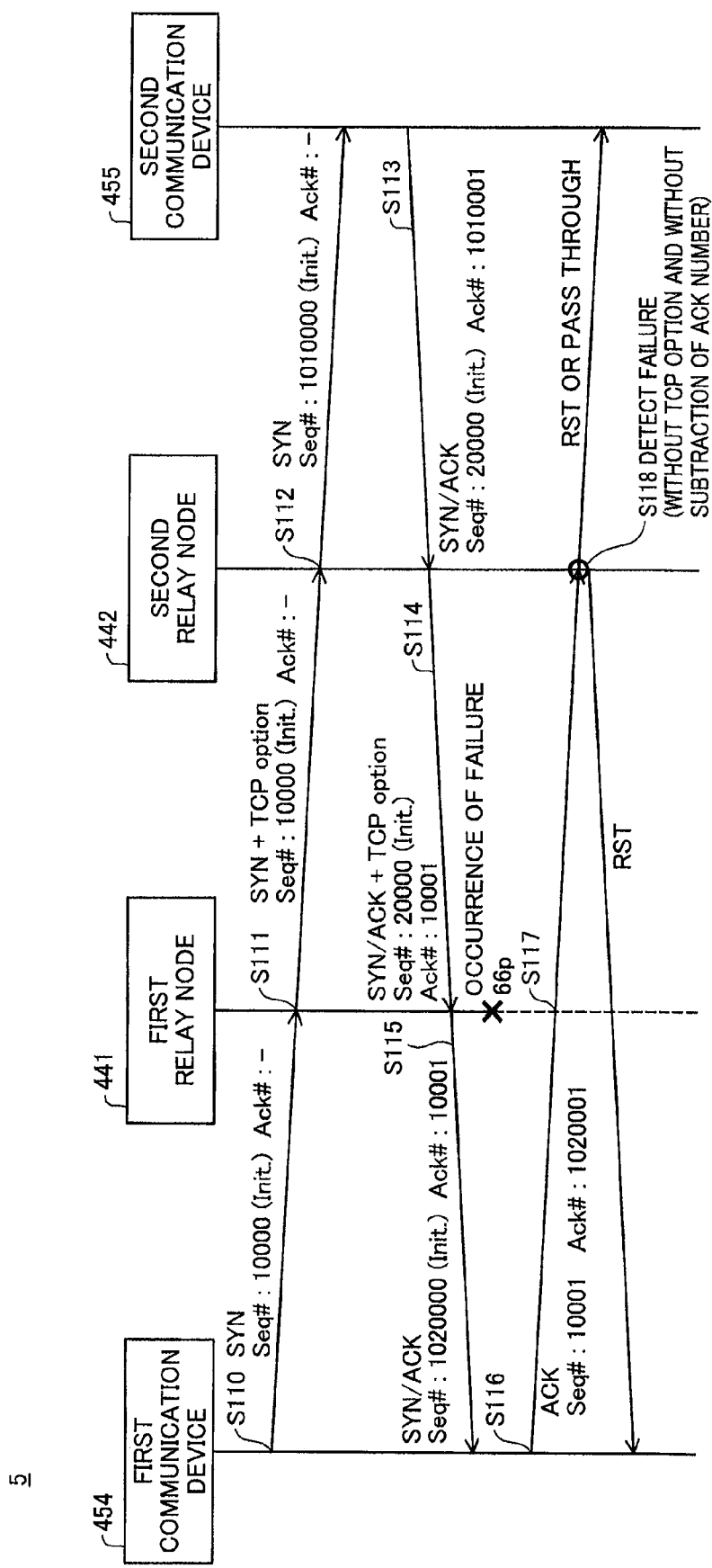
FIG. 12 is a diagram illustrating a fifth mode of failure detection during three-way handshake.

FIG. 12 is a diagram illustrating a fifth mode of failure detection during three-way handshake. More specifically, FIG. 12 shows a process flow in the event of the occurrence of a failure in the first relay node 441 at the point 66p when the first relay node 441 sends an SYN/ACK packet to the first communication device 454.

Steps S110 to S115 in FIG. 12 are the same processing steps as steps S60 to S65 shown in FIG. 7 and are thus not specifically described here. After step S115, the first communication device 454 sends an ACK packet to the first relay node 441 with setting the ACK number of the received SYN/ACK packet as a sequence number (step S116). Since a failure occurs in the modifier 48, the first relay node 441 sends the received ACK packet to the second relay node 442 without processing the received ACK packet by its modifier 48 (step S117). The second relay node 442 detects no addition of a TCP option to the received ACK packet and no sequence subtraction from the ACK number and thereby detects the occurrence of a failure in the remote first relay node 441 (step S118). After detecting the occurrence of a failure in the remote first relay node 441, the second relay node 442 may send a reset (RST) packet to the first communication device 454 via the second communication device 455 and the first relay node 442 and forcibly terminate the subsequent communication. After detecting the occurrence of a failure in the remote first relay node 441, the second relay node 442 may pass through the received SYN/ACK packet and send the SYN/ACK packet to the first communication device 454, so as to continue the process of three-way handshake.

B-2-7. Sixth Failure Detection Mode

Figure 13:
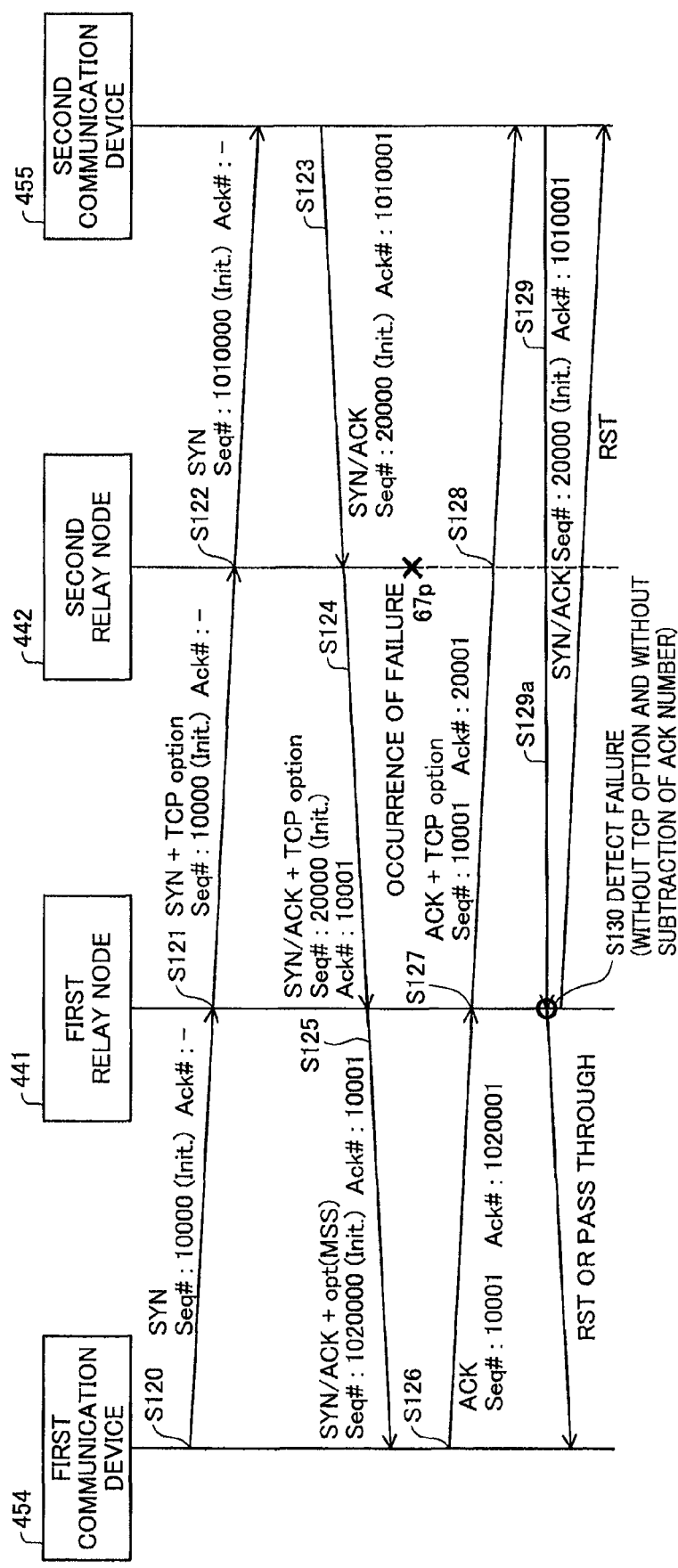
FIG. 13 is a diagram illustrating a sixth mode of failure detection during three-way handshake.

FIG. 13 is a diagram illustrating a sixth mode of failure detection during three-way handshake. More specifically, FIG. 13 shows a process flow in the event of the occurrence of a failure in the second relay node 442 immediately after the second relay node 442 sends an SYN/ACK packet to the first relay node 441.

Steps S120 to S126 in FIG. 13 are the same processing steps as steps S60 to S66 shown in FIG. 7 and are thus not specifically described here. When receiving an ACK packet sent from the first communication device 454, the first relay node 441 adds a TCP option to the received ACK packet, subtracts the protocol specific number 1000000 from the ACK number and sends the ACK packet to the second relay node 442 (step S127). Since a failure occurs in the modifier 48, the second relay node 442 sends the ACK packet received from the first relay node 441 to the second communication device 455 without processing the received ACK packet by its modifier 48 (step S128). The second communication device 455 receives the ACK packet but retransmits the same SYN/ACK packet as that sent at step S123 to the second relay node 442 (step S129), since the sequence number of the received ACK packet is different from an expected sequence number (sequence number: 1010001). The second relay node 442 passes through the retransmitted SYN/ACK packet and sends the SYN/ACK packet to the first relay node 441 (step S129a). The first relay node 441 detects no addition of a TCP option to the received SYN/ACK packet and no sequence subtraction from the ACK number and thereby detects the occurrence of a failure in the remote second relay node 442 (step S130). After detecting the occurrence of a failure in the remote second relay node, the first relay node 441 may send a reset (RST) packet to the second communication device 455 via the first communication device 454 and the second relay node 442 and forcibly terminate the subsequent communication. After detecting the occurrence of a failure in the remote second relay node 442, the first relay node 441 may pass through the received SYN/ACK packet and send the SYN/ACK packet to the first communication device 454, so as to continue the process of three-way handshake.

B-3. Detection of Occurrence of Failure after Establishment of Connection

Figure 14:
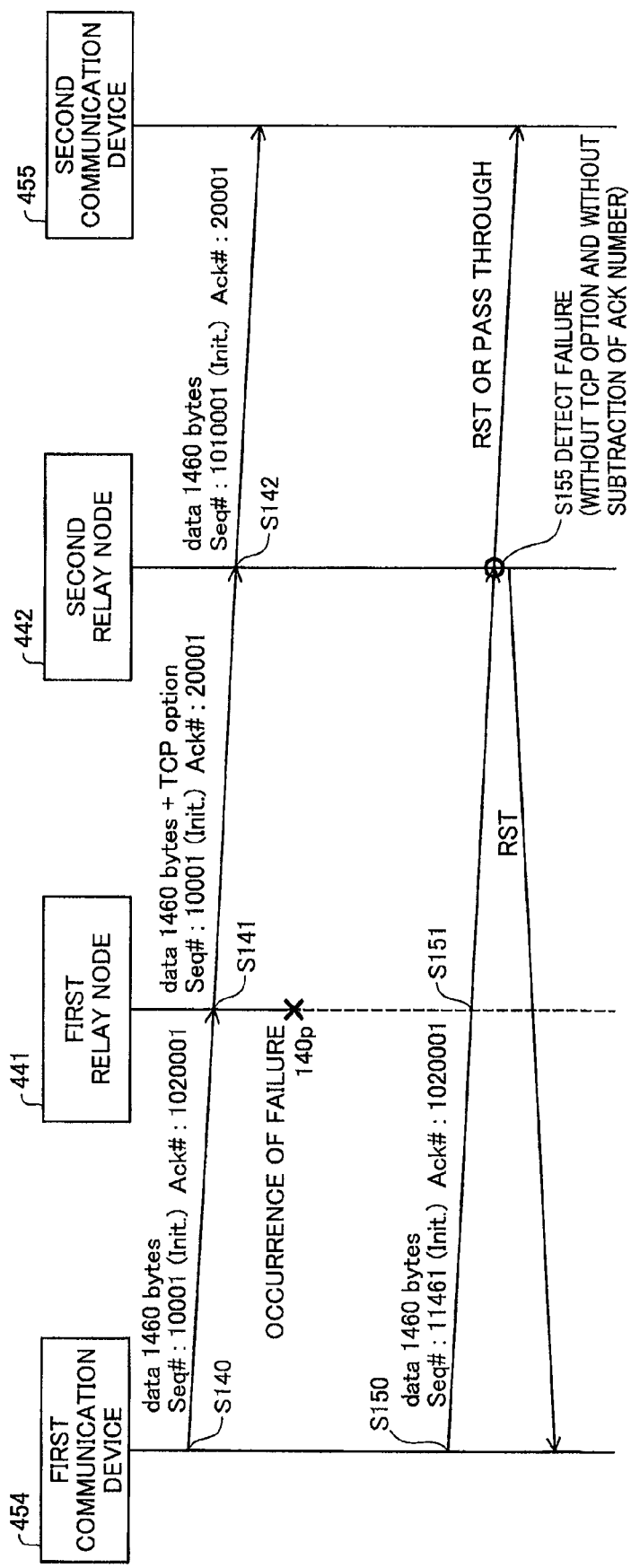
FIG. 14 is a diagram illustrating a first failure detection mode in the event of the occurrence of a failure during data communication by TCP.

FIG. 14 is a diagram illustrating the first failure detection mode in the event of the occurrence of a failure during data communication by TCP. More specifically, FIG. 14 shows a process flow of failure detection in the event of the occurrence of a failure in the first relay node 441 at a point 140p when transmission of data with a sequence number 10001 to the second communication device 455 is completed (after completion of steps S140 to S142). In the diagram of FIG. 14, an ACK packet with respect to the data with the sequence number 10001 is omitted from the illustration.

After sending the data with the sequence number 10001 to the first relay node 441, the first communication device 454 sends data with a sequence number 11461 to the first relay node 441 (step S150). Since a failure occurs in the first relay node 441, the first relay node 441 sends the received data to the second relay node 441 without processing the received data by its modifier 48 (step S151). When receiving the data with the sequence number 11461, the second relay node 442 detects no addition of a TCP option to the received data and no sequence subtraction from the ACK number and thereby detects the occurrence of a failure in the remote first relay node 441 (step S155). After detecting the occurrence of a failure in the remote first relay node 441, the second relay node 442 may send a reset (RST) packet to the first communication device 454 via the second communication device 455 and the first relay node 441 and forcibly terminate the subsequent communication. After detecting the occurrence of a failure in the remote first relay node 441, the second relay node 442 may pass through the received data and send the received data to the second communication device 455. In the state that the second relay node 442 passes through the received data and sends the received data to the second communication device 455, when the ACK number of the received data is different from a number obtained by adding the protocol specific number 1000000 to an expected ACK number, the second communication device 455 determines a sequence error. The second communication device 455 then sends the expected ACK number (ACK number 20001 in the illustrated example) to the first communication device 454 via the second relay node 442 and the first relay node 441.

FIG. 15 is a diagram illustrating the second failure detection mode in the event of the occurrence of a failure during data communication by TCP. More specifically, FIG. 15 shows a process flow of failure detection in the event of the occurrence of a failure in the second relay node 442 after completion of transmission of data with a sequence number 10001 to the second communication device 455 (after completion of steps S160 to S162).

After sending the data with the sequence number 10001 to the first relay node 441, the first communication device 454 sends data with a sequence number 11461 to the first relay node 441 (step S170). The first relay node 441 adds a TCP option to the received data with the sequence number 11461, subtracts the protocol specific number 1000000 from the ACK number and sends the resulting data to the second relay node 442 (step S171). The second relay node 442 passes through the received data (step S172). The second communication device 455 receives the data passing through the second relay node 442. The received data, however, has the sequence number that is different from an expected sequence number (sequence number 1011461). The second communication device 455 accordingly determines a sequence error and sends back an ACK packet for retransmission request (step S180). Since a failure occurs in the second relay node 442, the second relay node 442 passes through the ACK packet for retransmission request (step S181). The first relay node 441 detects no addition of a TCP option to the ACK packet for retransmission request and no sequence subtraction from the ACK number and thereby detects the occurrence of a failure in the remote second relay node 442 (step S185). After detecting the occurrence of a failure in the remote second relay node 442, the first relay node 441 may send a reset (RST) packet to the second communication device 455 via the first communication device 454 and the second relay node 442 and forcibly terminate the subsequent communication. After detecting the occurrence of a failure in the remote second relay node 442, the first relay node 441 may pass through the received data and send the received data to the first communication device 454. In the illustrated example of FIG. 15, the first relay node 441 detects the occurrence of a failure, based on the ACK packet with respect to the data with the sequence number 11461 (step S185). When an ACK packet with respect to the data with the sequence number 10001 is sent prior to step S180, the occurrence of a failure may be detected, based on this ACK packet.

B-4. Advantageous Effects

As described above, each of the first and the second relay nodes 441 and 442 can readily detect the occurrence of a failure in the other of the relay nodes 441 and 442, based on at least one of the TCP option and the ACK number. In the event of the occurrence of a failure in either the first relay node 441 or the second relay node 442, the other relay node can promptly perform processing to continue the data communication, such as data transmission by pass-through or transmission of an RST packet, without waiting for interruption of data communication by, for example, a timeout.

The procedure of the above embodiment detects the occurrence of a failure in the relay node 441 or 442, based on the TCP option and the ACK number (for example, FIGS. 10, 12 and 13). Using the ACK number in addition to the TCP option as the criteria for detecting the occurrence of a failure reduces the possibility that each of the relay nodes 441 and 442 fails to detect the occurrence of a failure in the remote relay node 441 or 442, based on a packet with a TCP option mistakenly entering from another network (connection). The embodiment accordingly establishes the network system 5 that can detect the occurrence of a failure in each of the relay nodes 441 and 442 with high accuracy.

In the state that the fault detector 46 detects the occurrence of a failure in the remote relay node 441 or 442 based on the received data, when the data received by the remote relay node 441 or 442, at which the occurrence of a failure is detected, includes an SYN packet, the procedure of the above embodiment processes the subsequent data by pass-through (FIG. 8). This enables establishment of a connection without interrupting the process of three-way handshake.

In the state that the fault detector 46 detects the occurrence of a failure in the remote relay node 441 or 442 based on the received data, when the data received by the remote relay node 441 or 442, at which the occurrence of a failure is detected, includes an ACK packet responding to an SYN packet as a request for establishment of a TCP connection, the procedure of the above embodiment processes the subsequent data by pass-through (FIG. 9). This enables establishment of a connection without interrupting the process of three-way handshake.

The first relay node 441 and the second relay node 442 of the embodiment described above may correspond to the "first relay node" described in Solution to Problem. More specifically, when the first relay node 441 of the above embodiment corresponds to the "first relay node" described in Solution to Problem, the second relay node 442 corresponds to the "second relay node" described in Solution to Problem. When the second relay node 442 of the above embodiment corresponds to the "first relay node" described in Solution to Problem, the first relay node 441 corresponds to the "second relay node" described in Solution to Problem.

C. Modifications

The foregoing has described one embodiment of the invention. The invention is, however, not limited to the above embodiment, but a multiplicity of variations and modifications may be made to the embodiment without departing from the scope of the invention. Some examples of possible modification are given below.

C-1. First Modification

The failure detection modes according to the above embodiment include the mode that detects no addition of a TCP option to the data and no subtraction from the ACK number and thereby detect the occurrence of a failure in the remote relay node 441 or 442 (for example, B-2-4. Third failure detection mode). This is, however, not restrictive. One of the relay nodes 441 and 442 may detect the occurrence of a failure in the remote relay node 441 or 442, based on detection of at least either of no addition of a TCP option to the data and no subtraction from the ACK number. In the example of FIG. 10, the first relay node 441 may detect no addition of a TCP option to the data received by the first relay node 441 and thereby detect the occurrence of a failure in the remote second relay node 442. In the example of FIG. 10, the first relay node 441 may detect no subtraction of the protocol specific number from the ACK number of the data received by the first relay node 441 and thereby detect the occurrence of a failure in the remote second relay node 442. The relay node may thus be constructed to have any of the configurations of the following variations:

First Variation

A first relay node located in a network that comprises two terminals, each being provided to transmit data by data stream service using a sequence number, and the first relay node and a second relay node arranged in series on a communication path between the two terminals and provided to relay data between the two terminals, the first relay node comprising:
a forwarding controller configured to forward received data; and
a fault detector configured to detect occurrence of a failure in the remote second relay node, wherein
the forwarding controller includes:
a forwarding unit configured to forward the received data; and
a modifier configured to modify the received data for detection of the occurrence of a failure in the second relay node, the modifier including (i) a flag option marker configured to attach a flag denoting transmission of data between the first relay node and the second relay node, to data to be forwarded to the second relay node, wherein
the flag is attached as an element used by the fault detector to detect the occurrence of a failure in the remote second relay node.

The first relay node according to this first modification can detect the occurrence of a failure in the remote second relay node, based on the flag. When the data received from the second relay node does not include the flag, the fault detector can readily detect the occurrence of a failure in the second relay node.

Second Variation

A first relay node located in a network that comprises two terminals, each being provided to transmit data by data stream service using a sequence number, and the first relay node and a second relay node arranged in series on a communication path between the two terminals and provided to relay data between the two terminals, the first relay node comprising:
a forwarding controller configured to forward received data; and
a fault detector configured to detect occurrence of a failure in the remote second relay node, wherein
the forwarding controller includes:
a forwarding unit configured to forward the received data; and
a modifier configured to modify the received data for detection of the occurrence of a failure in the second relay node, the modifier including: (i) a sequence adding unit configured to add a protocol specific number to a sequence number attached to data that is to be sent from one of the terminals as a source terminal when the data is sent to the remote terminal; and (ii) a sequence subtracting unit configured to subtract the protocol specific number from an acknowledgement number attached to data received from the remote terminal, when the data is received from the remote terminal, wherein the acknowledge number is attached as an element used by the fault detector to detect the occurrence of a failure in the remote second relay node.

The first relay node according to the second variation can detect the occurrence of a failure in the remote second relay node, based on the acknowledgement number. When the acknowledgement number included in the data received from the second relay node is equal to the sum of the protocol specific number and an expected number to be originally received, the fault detector can readily detect the occurrence of a failure in the second relay node.

C-2. Second Modification

In the embodiment described above, the first communication device 454 and the second communication device 455 adopt TCP for data communication. The protocol used for data communication is, however, not limited to TCP. The present invention is applicable to data communication performed between the first communication device 454 and the second communication device 455 by data stream service using a sequence number. For example, the present invention is applicable to data communication by RTCP (Real-Time Transport Control Protocol).

C-3. Third Modification

In the embodiment described above, each of the first and second relay nodes 441 and 442 detects the occurrence of a failure in the remote relay node 441 or 442 and sends an RST packet to interrupt the data communication. The data communication may, however, be interrupted by a different procedure. A controller connected to the network system 5 may be newly provided. When each of the relay nodes 441 and 442 detects a failure, the relay node detecting the failure may inform the controller of detection of the failure, and the controller may interrupt the data communication in response to reception of information on the detection of the failure.

REFERENCE SIGNS LIST 5, 5w Network System
10w First Relay Node
11w Second Relay Node
20w First Communication Device
21w Second Communication Device
41, 42 Input-Output Interface
44 Forwarding Controller
46 Fault Detector
48 Modifier
48a Flag Option Marker
48b Sequence Adding Unit
48c Sequence Subtracting Unit
49 Forwarding Unit
441 First Relay Node
442 Second Relay Node
454 First Communication Device
455 Second Communication Device

The invention claimed is:

1. A first relay node located in a network that comprises two terminals, each being provided to transmit data by data stream service using a sequence number, and the first relay node and a second relay node arranged in series on a communication path between the two terminals and provided to relay data between the two terminals,
the first relay node comprising:
a forwarding controller configured to forward received data; and
a fault detector configured to detect occurrence of a failure in the second relay node, wherein
the forwarding controller includes:
a forwarding unit configured to forward the received data; and
a modifier configured to modify the received data for detection of the occurrence of a failure in the second relay node, the modifier including (i) a flag option marker configured to attach a flag, the flag denoting transmission of data between the first relay node and the second relay node, to data to be forwarded to the second relay node; (ii) a sequence adding unit configured to add a protocol specific number to a sequence number attached to data that is to be sent from one of the terminals as a source terminal when the data is sent to a remote terminal; and (iii) a sequence subtracting unit configured to subtract the protocol specific number from an acknowledgement number attached to data received from the remote terminal, when the data is received from the remote terminal, wherein
the fault detector detects the occurrence of a failure in the second relay node, based on at least one of the flag and the acknowledgement number.

2. The first relay node according to claim 1, wherein
the fault detector detects the occurrence of a failure in the second relay node, when the flag is not attached to data received from the second relay node.

3. The first relay node according to claim 1, wherein
the fault detector detects the occurrence of a failure in the second relay node, when the acknowledgement number included in data received from the second relay node is equal to sum of the protocol specific number and an expected number to be originally received.

4. The first relay node according to claim 1, wherein
the fault detector detects the occurrence of a failure in the second relay node, when the flag is not attached to data received from the second relay node and when the acknowledgement number included in the received data is equal to sum of the protocol specific number and an expected number to be originally received.

5. The first relay node according to claim 1, wherein
the two terminals adopt TCP for communication, and
in the state that the fault detector detects the occurrence of a failure in the second relay node based on received data, when the received data includes an SYN packet as a request for establishment of a TCP connection, the forwarding controller forwards the received data without enabling function of the modifier.

6. The first relay node according to claim 1, wherein
the two terminals adopt TCP for communication, and
in the state that the fault detector detects the occurrence of a failure in the second relay node based on received data, when the received data includes an acknowledgement packet responding to an SYN packet as a request for establishment of a TCP connection, the forwarding controller forwards the received data without enabling function of the modifier.

7. A control method of a first relay node located in a network that includes two terminals, each being provided to transmit data by data stream service using a sequence number, and the first relay node and a second relay node arranged in series on a communication path between the two terminals and provided to relay data between the two terminals,
the control method comprising the steps of:
(a) forwarding received data; and
(b) detecting occurrence of a failure in the second relay node, wherein
the step (a) includes: the steps of:
(a1) attaching a flag denoting transmission of data between the first relay node and the second relay node, to data to be forwarded to the second relay node;

(a2) adding a protocol specific number to a sequence number attached to data that is to be sent from one of the terminals as a source terminal when the data is sent to a remote terminal; and (a3) subtracting the protocol specific number from an acknowledgement number attached to data received from the remote terminal, when the data is received from the remote terminal, wherein the step (b) includes the step of detecting the occurrence of a failure in the second relay node, based on at least one of the flag and the acknowledgement number.

8. A network system, comprising:

two terminals, each being provided to transmit data by data stream service using a sequence number; and a first relay node and a second relay node arranged in series on a communication path between the two terminals and provided to relay data between the two terminals, wherein each of the first relay node and the second relay node includes:

a forwarding controller configured to forward received data; and a fault detector configured to detect occurrence of a failure in a remote other relay node, wherein the forwarding controller includes:

a forwarding unit configured to forward the received data; and a modifier configured to modify the received data for detection of the occurrence of a failure in the other relay node, the modifier including (i) a flag option marker configured to attach a flag denoting transmission of data between the first relay node and the second relay node, to data to be forwarded to the other relay node; (ii) a sequence adding unit configured to add a protocol specific number to a sequence number attached to data that is to be sent from one of the terminals as a source terminal when the data is sent to a remote terminal; and (iii) a sequence subtracting unit configured to subtract the protocol specific number from an acknowledgement number attached to data received from the remote terminal, when the data is received from the remote terminal, wherein the fault detector detects the occurrence of a failure in the second relay node, based on at least one of the flag and the acknowledgement number.

* * * * *

UNITED STATES PATENT AND TRADEMARK OFFICE
CERTIFICATE OF CORRECTION

PATENT NO. : 8,948,185 B2
APPLICATION NO. : 13/818028
DATED : February 3, 2015
INVENTOR(S) : Hideyuki Magoshi and Satoshi Fujisawa It is certified that error appears in the above-identified patent and that said Letters Patent is hereby corrected as shown below:

On the Title Page at item (73) Assignee: add "Alaxala Networks Corporation, Kanagawa (JP)" as a second assignee.

Signed and Sealed this
Fourteenth Day of July, 2015

Michelle K. Lee
*Director of the United States Patent and Trademark Office*